United States Patent
Ramakrishnan et al.

(10) Patent No.: US 8,510,562 B2
(45) Date of Patent: Aug. 13, 2013

(54) CONTENT DISTRIBUTION WITH MUTUAL ANONYMITY

(75) Inventors: Kadangode K. Ramakrishnan, Berkeley Heights, NJ (US); Vijay Gopalakrishnan, Summit, NJ (US); Fang Yu, Columbus, OH (US); David Lee, Columbus, OH (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 450 days.

(21) Appl. No.: 12/728,910

(22) Filed: Mar. 22, 2010

(65) Prior Publication Data

US 2011/0231661 A1    Sep. 22, 2011

(51) Int. Cl.
*H04L 29/06* (2006.01)

(52) U.S. Cl.
USPC ............................ 713/171; 709/201; 370/230

(58) Field of Classification Search
None
See application file for complete search history.

(56) References Cited

U.S. PATENT DOCUMENTS

| | | | |
|---|---|---|---|
| 2006/0023646 A1* | 2/2006 | George et al. | 370/282 |
| 2006/0218222 A1 | 9/2006 | Brahmbhatt et al. | |
| 2007/0143770 A1 | 6/2007 | Kaler et al. | |
| 2008/0072037 A1* | 3/2008 | Narayanan et al. | 713/156 |
| 2008/0120416 A1 | 5/2008 | Hopkins et al. | |
| 2010/0153578 A1* | 6/2010 | Van Gassel et al. | 709/231 |
| 2010/0250917 A1* | 9/2010 | Marivoet et al. | 713/150 |

* cited by examiner

*Primary Examiner* — Brandon Hoffman
*Assistant Examiner* — Michael D Anderson
(74) *Attorney, Agent, or Firm* — Akerman Senterfitt; Michael K. Dixon; Roy Zachariah

(57) ABSTRACT

A method for transferring content includes requesting the content from a serving peer and sending the content to a requesting peer. Requesting the content includes sending a request to a tracker, receiving a request token, a path identifier, and a first peer identifier from the tracker, and sending a request message to a second peer. The first peer identifier includes an identity of a first peer, and the request message includes the request token, the path identifier, and the first peer identifier. Sending the content includes receiving the request token and the path identifier from a third peer, sending a return message to a fourth peer, and transferring the content from the serving peer to the requesting peer through a transfer path. The return message includes the path identifier and a second peer identifier. The second peer identifier includes an identity of a fifth peer. The transfer path includes at least the second, fourth, and fifth peers.

14 Claims, 9 Drawing Sheets

US 8,510,562 B2

CONTENT DISTRIBUTION WITH MUTUAL ANONYMITY

FIELD OF THE DISCLOSURE

The present disclosure generally relates to communications networks, and more particularly relates to content distribution with mutual anonymity.

BACKGROUND

Peer-to-peer (P2P) networks use diverse connectivity between participants in a network and the cumulative bandwidth of network participants, rather than conventional centralized resources where a relatively low number of servers provide a service or application. A pure P2P network does not have traditional clients or servers, but only equal peer nodes that simultaneously function as both "clients" and "servers" to the other nodes on the network.

P2P networks can be useful for sharing content files containing audio, video, or other data in digital format. It is estimated that P2P file sharing, such as BitTorrent, represents greater than 20% of all broadband traffic on the Internet.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
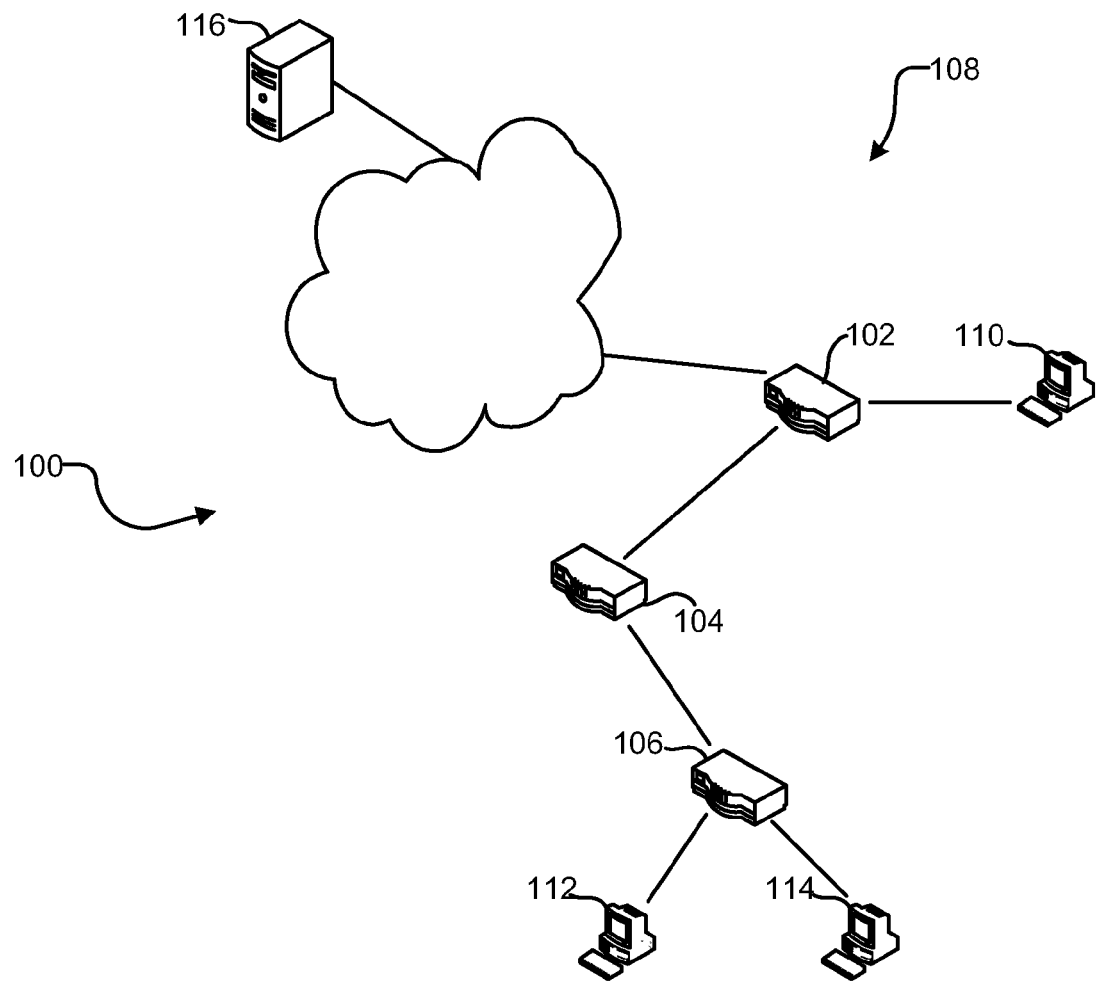
FIG. 1 is a block diagram illustrating a communications network in accordance with one embodiment of the present disclosure.

FIG. 1 shows a communications network 100, such as the Internet. Communications network 100 can include routers 102, 104, and 106 that communicate with each other and form an autonomous system (AS) 108. AS 108 can connect to other ASs that form network 100 through a peering point at router 102. Additionally, AS 108 can include peer systems 110, 112, and 114 connected to respective routers 102 and 106 to access the network 100. Router 102 can provide ingress and egress for peer system 110. Router 106 can provide ingress and egress for both of peer systems 112 and 114. Peer systems 110, 112, and 114 can form a P2P file-sharing network. In a P2P file-sharing network, peer system 110, for example, can request a data file from peer system 112. When peer system 112 has the data file, it can provide the data file to peer system 110.

In an embodiment, communications network 100 can also include an originating server 116. Peer system 110 can receive content from originating server 116 or other sources, and make the content available to peer systems 112 and 114 through the P2P network. For example, peer system 112 can request the content from peer system 110, and peer system 110 can provide the content to peer system 112.

Figure 2:
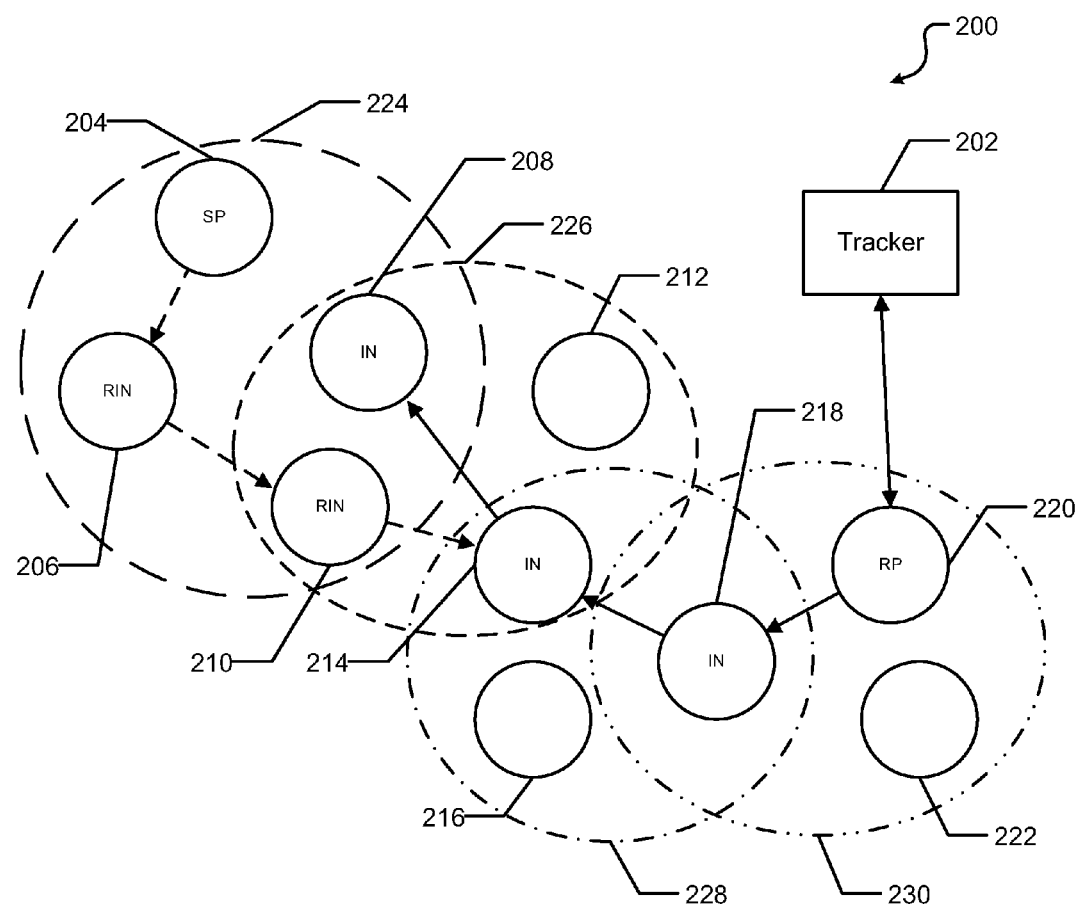
FIG. 2 is a block diagram illustrating a P2P network in accordance with one embodiment of the present disclosure.

FIG. 2 illustrates a P2P network 200. P2P network 200 can include a tracker 202 and peers 204, 206, 208, 210, 212, 214, 216, 218, 220, and 222. Peers 204, 206, 208, 210, 212, 214, 216, 218, 220, and 222 can be organized into overlapping groups of neighboring peers 224, 226, 228, and 230. Group 224 can include peers 204, 206, 208, and 210. Group 226 can include peers 208, 210, 212, and 214. Group 228 can include peers 214, 216, and 218. Group 230 can include peers 218, 220, and 222. In an embodiment, a peer can be aware of a group of neighboring peers and can communicate directly with the neighboring peers. To communicate with peers that are not within the group of neighboring peers, a path can be created through intermediate nodes spanning multiple overlapping neighboring groups.

In an embodiment, P2P network 200 can be set up by a service provider for distributing content, such as data or video. Participating clients can join the P2P network. When a peer, such as peer 220, requests content from the service provider, the peer can be redirected to one or more of the participating peers by tracker 202. In a particular embodiment, tracker 202 may verify that the requesting peer has the appropriate access rights for the requested content.

In an embodiment, a requesting peer (RP) 220 can contact tracker 202 to identify a path to a peer that can provide a content file. The content file can include a digital audio file such as an MP3, a digital video file, a data file, a software program, a software update, or other type of digital content. Tracker 202 can provide a list of peers 218, 214, and 208 along a path to a serving peer (SP) 204. At least one of the peers identified by tracker 202 can have the serving peer as a neighbor. Peer 204 can have the content file available for sharing with peer 220. Peers 218, 214, and 208 can act as intermediate nodes (INs) for communication between peer 220 and peer 204. In a particular embodiment, tracker 202 may not provide the identity of peer 204 to peer 220.

Peer 220 can send a message along a path comprised of peers 218, 214, and 208 with the expectation that the message can reach a peer able to provide the requested content. Additionally, peers 218, 214, and 208 can broadcast the message to all of their neighbors, so that the message can reach peer 204. Peer 204 can select peer 214 along the path and can establish a return path to peer 214 through peers 206 and 210. Peer 204 can send a return message to peer 214 along the return path. Once the return message reaches peer 214, a communication path (peers 206, 210, 214, and 218) including a portion of the path (peers 218 and 214) and a portion of the return path (206, 210, and 214) can be established between peers 204 and 220. The content file can be transferred from peer 204 to peer 220 through peers 206, 210, 214, 218 without peer 204 and peer 220 knowing the identity of the serving peer and the requesting peer. Additionally, peers 206, 208, 210, 214, and 218 can be unaware of the identity of the source and requesting peers.

In an embodiment, it can be desirable to maintain the anonymity of the peers within the P2P network. Specifically, the P2P network can ensure that no peer including serving peer can know which peer is requesting a particular content and that no peer including the requesting peer can know which peer is providing the content. Additionally, only the serving peer and the requesting peer can know the nature of the content. In this way, a compromised peer or external observer may not be able to identify which peer are requesting a particular content and which peers are making the particular content available to others.

In a particular embodiment, the P2P network can maintain k-anonymity of the source and requesting peer. As used herein, k-anonymity ensures that the source or requesting peer is indistinguishable from k good peers. An attacker can guess the identity of the source or requesting peer and claim that with a probability of 1/k the guess is correct.

In another embodiment, the P2P network can maintain community anonymity of the source and requesting peers. Community anonymity differs from k-anonymity in that the probability of the guess being correct can be unknown to the attacker. As used herein, community anonymity ensures that the source or requesting peer is indistinguishable from a set of x good peers with the precise value of x unknown to an attacker. A guess can be correct with a probability of 1/x. However, since the value of x is unknown to the attacker, the attacker cannot place an upper limit on the value of x. Thus, from the attacker's perspective, the probability of the guess being correct can be infinitely small.

Figure 3:
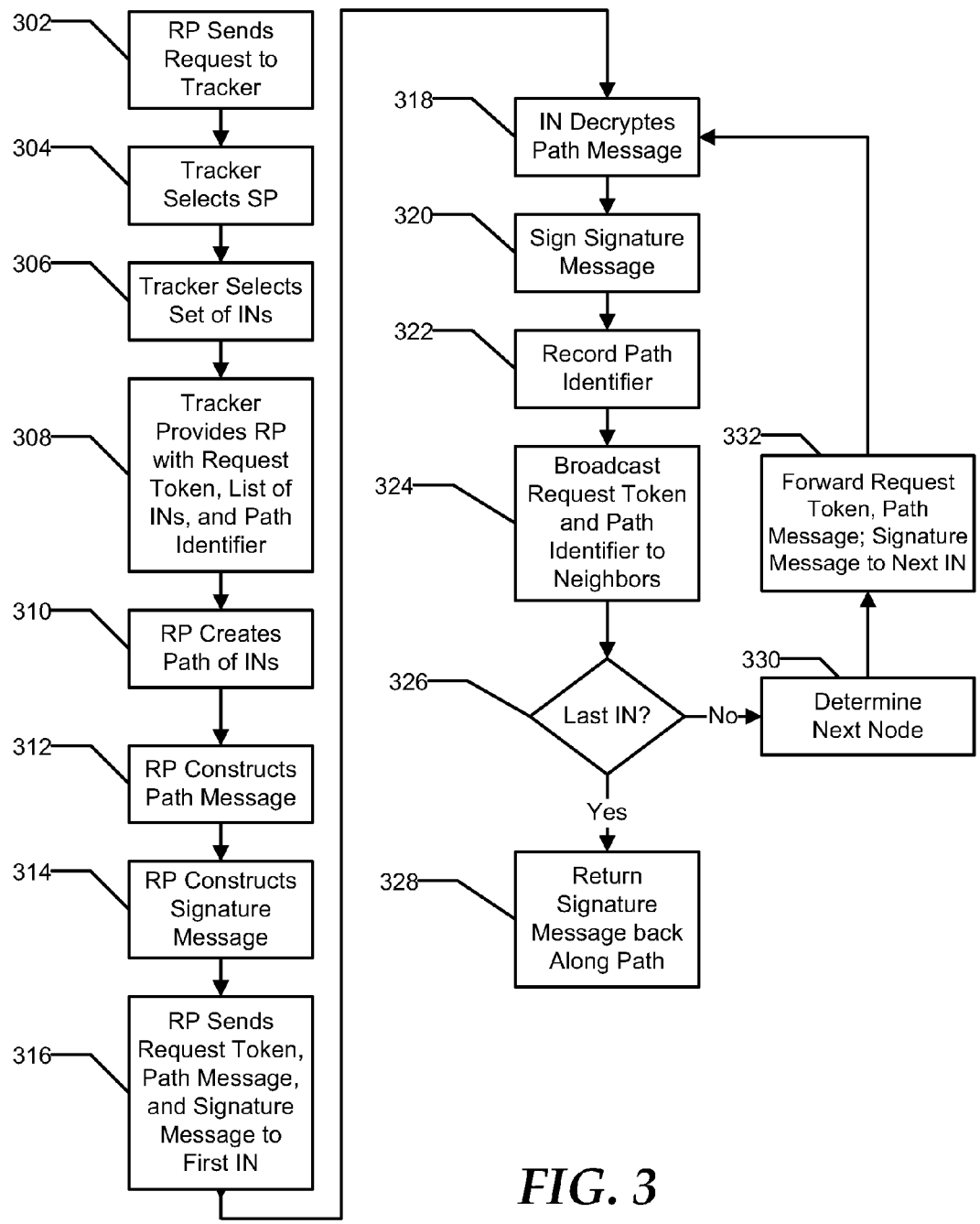
FIG. 3 is a flow diagram illustrating an exemplary method for sending a request for content to a serving peer in accordance with another embodiment of the present disclosure.

FIG. 3 shows a flow diagram illustrating a method for sending a request for content to a serving peer through a P2P network, such as P2P network 200. At 302, a requesting peer, such as peer 220, can send a request to a tracker, such as tracker 202. At 304, the tracker can select a serving peer. The serving peer can be a peer that has the content available for sharing with the requesting peer. At 306, the tracker can select a set of intermediate nodes. The intermediate nodes can include a peer that is a neighbor to the serving peer and an additional number of nodes. At 308, the tracker can provide the requesting peer with a request token, a list of the intermediate nodes, and a path identifier. The request token can be an encrypted message to the serving peer identifying the requested content and the intermediate nodes. The encrypted message may be encrypted with a public key of the serving peer so that only the serving peer can decrypt the message.

At 310, the requesting peer can create a path including the intermediate nodes. The path can include the intermediate nodes in any order. Optionally, the path can include one or more additional peers selected by the requesting peer. When the path includes additional peers, the additional peers can be placed in the path between the requesting peer and the intermediate nodes provided by the tracker. At 312, the requesting peer can construct a request message. The request message can include information about the path and the path identifier. In an embodiment, the message can encapsulate identifiers for the intermediate nodes using their public keys so that each node can decrypt a portion of the message to identify the two immediate neighbors on the path.

In an example, the path can be RP→A→B→D→C, where RP is the requesting peer and A, B, C, and D are intermediate nodes. The message can include a random number of bits ($PAD_{RP}$) to substantially prevent nodes B and D from knowing that they are communicating with an end node of the path. Additionally, the inclusion of $PAD_{RP}$ can substantially prevent node A from knowing RP is the requesting peer. The message can be as follows:

M1=E(PubKeyA, [previous_node=RP, next_node=B, path_ID=Pobj;
E(PubKeyB, [previous_node=A, next_node=D, path_ID=Pobj;
E(PubKeyD, [previous_node=B, next_node=C, path_ID=Pobj;
E(PubKeyC, [previous_node=D, next_node=NULL, path_ID=Pobj;
$PAD_{RP}$])])])])

At 314, the requesting peer can construct an initial signature message. The signature message $Sig_{RP}$ can include a random number of bits, such as $PAD_{RP}$. By utilizing a random number of bits as the initial signature message, the intermediate nodes can be prevented from knowing the identity of the requesting peer. At 316, the requesting peer can send the request token, the path message, and the initial signature message to the first peer in the path, for example peer A.

At 318, the intermediate node can decrypt the path message. Decrypting the path message can allow the intermediate node to read the next portion of the path message. The next portion of the path message can include the path identifier and the immediate neighbors to the intermediate node along the path. A remaining portion of the path message can be further encrypted with the public keys of remaining peers along the path and can be unreadable by any of the other intermediate nodes.

At 320, the intermediate node can add the path identifier and a previous portion of the signature message and sign the signature message with its private key. By modifying the signature in this way, the signature can be later used to verify the request did pass through the intermediate node. In an embodiment, the intermediate node can be peer A. Peer A can produce a random sequence of bits of arbitrary length ($PAD_A$). Peer A can encrypt its peer identifier, the object identifier, the length of $PAD_A$, $PAD_A$ itself, and the previous portion of the signature message. The inclusion of $PAD_A$ can substantially prevent other nodes from inferring the path length or their position in the path from the signature message. Additionally, the increasing size of the signature message and the decreasing size of the path message as the messages progress along the path can substantially prevent an observer from determining the number of hops away from the requesting peer. For example, the signature message can be $SigA=E(PrivKeyA, [A\|Pobj\|L(PAD_A)\|PAD_A\|Sig_{RP}])$ At 322, the intermediate node can store the route identifier. At 324, the intermediate node can broadcast the route token and path identifier to the neighbors. At least one of the intermediate nodes selected by the tracker can be a neighbor of the serving peer, so that the serving peer can receive the route token and the path identifier as a broadcast from one of the intermediate nodes.

At 326, the intermediate node can determine if it is the last peer along the path. For example, the intermediate node can be the last peer along the path when the next peer identifier in the path message is NULL. At 328, when the intermediate node is the last node along the path, the intermediate node can return the signature message back along the path towards the requesting peer. Each intermediate node along the path can store the signature message and forward the signature message to the previous peer in the path in the request path.

Alternatively, at 330, the intermediate node can determine the next peer along the path. The next peer along the path can be indicated in the route message. At 332, the intermediate node can forward the request token, the path message, and the signature message to the next intermediate node along the path.

Figure 4:
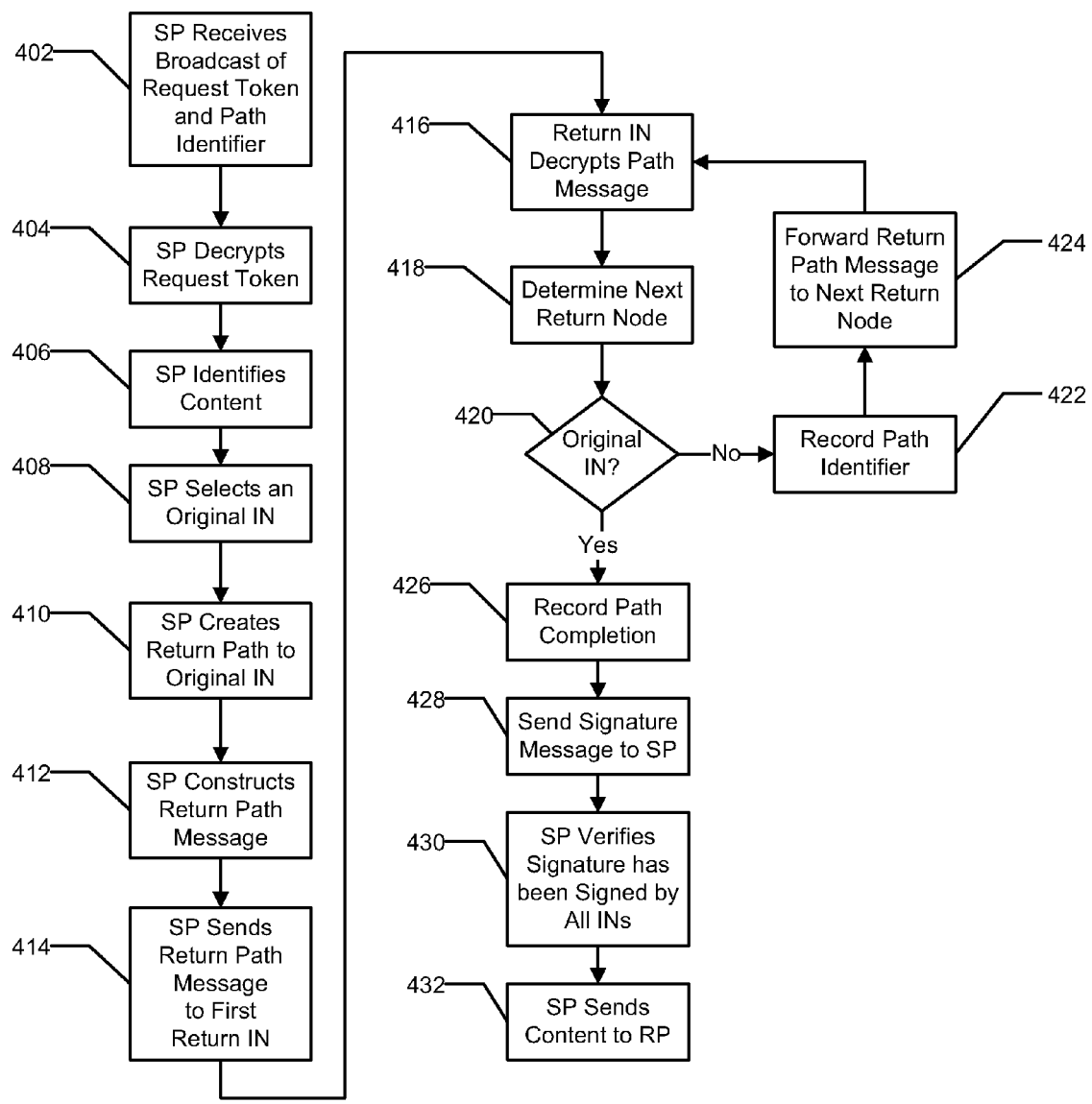
FIG. 4 is a flow diagram illustrating an exemplary method for providing content to a requesting peer in accordance with another embodiment of the present disclosure.

FIG. 4 shows a flow diagram illustrating an exemplary method for providing content to a requesting peer. At 402, the serving peer can receive the request token and path identifier as a broadcast from one of the intermediate nodes. At 404, the serving peer can decrypt the request token. The request token can be a message including the identity of the requested content and of the intermediate nodes. The encrypted message may be encrypted with a public key of the serving peer so that only the serving peer can decrypt the message. At 406, the serving peer can identify the content based on the identifier within the request token. At 408, the serving peer can select one of the original intermediate nodes identified in the request token. At 410, the serving peer can create a return path to the selected original intermediate node. The return path can include one or more additional peers known to the serving peer and can end at the selected original intermediate node.

At 412, the serving peer can construct a return path message. The return path message can include information about the return path, a return path identifier ($P_R$obj), and the original path identifier (Pobj). In an embodiment, the return path message can encapsulate identifiers for the intermediate nodes of the return path using their public keys. Each node can decrypt a portion of the return path message using its private key. The decrypted portion can identify the previous intermediate node and the next intermediate node along the return path, as well as the original path identifier and the return path identifier.

In an example, the return path can be SP→E→F→D, where SP is the serving peer, E and F are additional peers selected by the serving peer, and D is one of the original intermediate nodes identified by the serving peer. The return path message can include a random number of bits ($PAD_{SP}$) to prevent nodes E and F from knowing that they are communicating with an end node of the path. The message can be as follows:

```
M1=E(PubKeyE, [previous_node=SP, next_node=F, path_ID=Pobj;
E(PubKeyF, [previous_node=A, next_node=D, path_ID=Pobj;
E(PubKeyD, [previous_node=B, next_node=NULL,
return_path_ID=P_Robj, path_ID=Pobj; PAD_SP])])])
```

At 414, the serving peer can send the return path message to the first intermediate node along the return path, for example node E. At 416, the return intermediate node can decrypt the return path message. Decrypting the return path message can allow the return intermediate node to read the next portion of the path message. The next portion of the path message can include the return path identifier and the immediate neighbors to the intermediate node along the return path. A remaining portion of the return path message can be further encrypted with the public keys of remaining peers along the path.

At 420, the intermediate node can determine if it is the original intermediate node. For example, the next node identifier in the return path message can be NULL when the peer is the original intermediate node selected by the serving peer.

At 422, when the intermediate node is not the original intermediate node selected by the serving peer, the intermediate node can record the return path identifier. At 424, the intermediate node can forward the return path message to the next node on the return path.

Alternatively, when the intermediate node is the original intermediate node, the intermediate node can record completion of a transfer path, as illustrated at 426. The transfer path can include a portion of the return path selected by the serving peer and an initial portion of the original path from the requesting peer to the intermediate node selected by the serving peer. In an embodiment, the intermediate node can compare the original path identifier from the return path message to the path identifier stored previously during creation of the forward path to verify the path.

At 428, the intermediate node can send the signature to the serving peer back along the return path. Each intermediate node can forward the signature message until it reaches the serving peer. At 430, the serving peer can verify that all intermediate nodes selected by the tracker have signed the signature. In an embodiment, the serving peer can know the identities of the intermediate nodes selected by the tracker based on the information included in the request token. The serving peer can decrypt the signature message by systematically trying the public keys for each of the intermediate nodes selected by the tracker. In an example where the path is RP→A→B→D→C, the signature can be as follows:

```
SigA= E(PrivKeyC,[C||Pobj||L(PAD_C)||PAD_C||
E(PrivKeyD,[D||Pobj||L(PAD_D)||PAD_D||
E(PrivKeyB,[B||Pobj||L(PAD_B)||PAD_B||
E(PrivKeyA,[A||Pobj||L(PAD_A)||PAD_A||Sig_RP])])])])
```

In the example, the serving peer can systematically try to decrypt the above signature message with the public keys from peers A, B, C, and D. In the first step, the serving peer can try the public keys from peers A, B, and C, successfully decrypting the first part of the message with PubKeyC. Since the public key of peer C successfully decrypted the first part of the message, the serving peer may not try the public key for peer D. In the second step, the serving peer can try the public keys from peers A, B, and D, successfully decrypting the second part of the message with PubKeyD. Since the public key for peer C was utilized to decrypt a previous part of the message, the serving peer may not try to decrypt subsequent parts with the public key for peer C. In the third step, the serving peer can try the public keys from peers A and B, successfully decrypting the third part of other message with PubKeyB. In the final step, the serving peer can decrypt the fourth part of the message with PubKeyA. The serving peer can verify that each of the intermediate nodes identified by the tracker was used in the path since the public key from each intermediate node was used to decrypt the signature.

At 432, the serving peer can send the content to the requesting peer along the transfer path. The serving peer can elect to send the content after verification that all intermediate nodes identified by the tracker were used in the path. In an embodiment, the content can be encrypted with an encryption key provided by the tracker to prevent the intermediate nodes from accessing the content. For example, an encryption key can be provided in the request token for the serving peer and a decryption key can be provided to the requesting peer.

Figure 5:
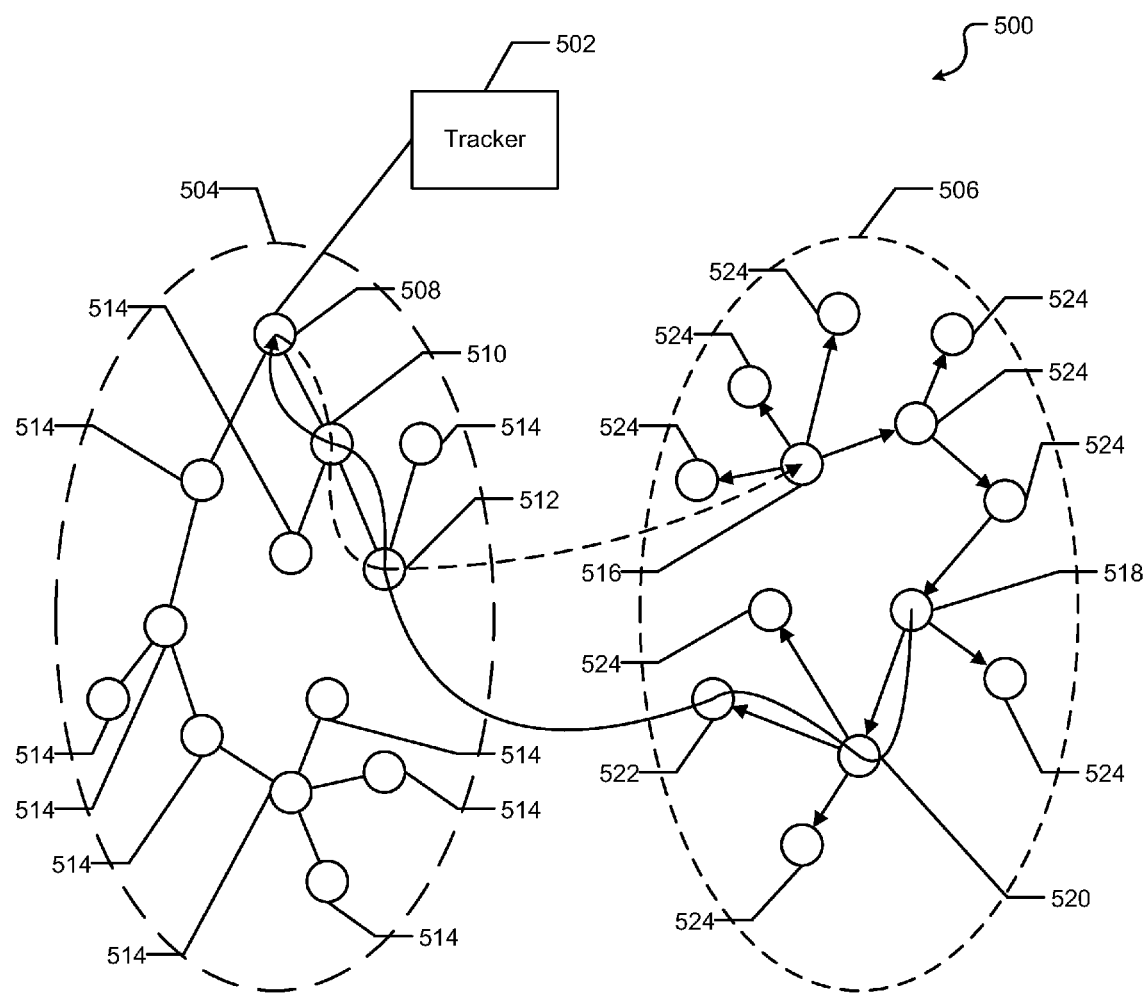
FIG. 5 is a block diagram illustrating another P2P network in accordance with one embodiment of the present disclosure.

FIG. 5 shows an exemplary P2P network 500. P2P network 500 can include a tracker 502 and trees 504 and 506. Tree 504 can include a requesting peer 508, an intermediate node 510, a peer 512, and a plurality of additional peers 514. Tree 506 can include a landing point 516, a serving peer 518, intermediate nodes 520 and 522, and a plurality of additional peers 524.

In an embodiment, requesting peer 508 can contact tracker 502 to request a source for a content file. The content file can include a digital audio file such as an MP3 file, a digital video file, a data file, a software program, a software update, or other type of digital content. Tracker 502 can provide a landing point identifier, a request token, and a path identifier. The landing point identifier can include the identity of landing point 516. The request token can be an encrypted message to the serving peer identifying the requested content. The encrypted message may be encrypted with a public key of the serving peer so that only the serving peer can decrypt the message. Requesting peer 508 can forward the request to neighboring peer 510, which can forward the request to another neighbor 512. Neighbor 512 can choose to forward it to another neighbor in the same tree or forward the request to landing point 516. If neighbor 512 forwards the request to landing point 516, neighbor 512 is considered a jumping point. Landing point 516 can forward the request throughout tree 506 by flooding the request to all the nodes including serving peer 518.

In an embodiment, the path can be constructed to avoid congested peers. Congested peers can be peers that are unable to handle the content transfer, such as due to limited bandwidth or other resources. When a first peer, such as neighboring peer 510, forwards the request to a second peer, such as neighboring peer 512, the second peer can determine if the resources are available to handle the request, specifically if the second peer can participate in transferring the content from the serving peer to the requesting peer. If the second peer determines that the resources are not available, the second peer can provide the first peer with a negative acknowledgement. Upon receiving the negative acknowledgement, the first peer can try additional neighboring peers or forward the request to the landing point. In a particular embodiment, when the first peer receives a negative acknowledgement from all of the neighboring peers other than the peer it received the request from, the first peer may send a request to the tracker for an additional peer to join the tree by connecting to the first peer.

Serving peer 518 can decrypt the request token to identify the requested content and forward a response to intermediate node 520, and intermediate node 520 can forward the response to intermediate node 522. Intermediate node 522 can forward the response to jumping point 512, thus enabling the establishment of a connection between serving peer 518 and requesting per 508 via intermediate node 522, jumping point 512, and other nodes. The formation of the path from serving peer 518 to jumping point 512 can be similar to the formation of the path from requesting peer 508 to landing point 516, including techniques for selecting the next neighbor peer and avoiding congestion. The connection can be used to transfer the requested content from serving peer 518 to requesting peer 508. The communication can be encrypted to prevent peers 510, 512, 520, and 522 or an outside observer from viewing the communication and determining the identity of the content.

Figure 6:
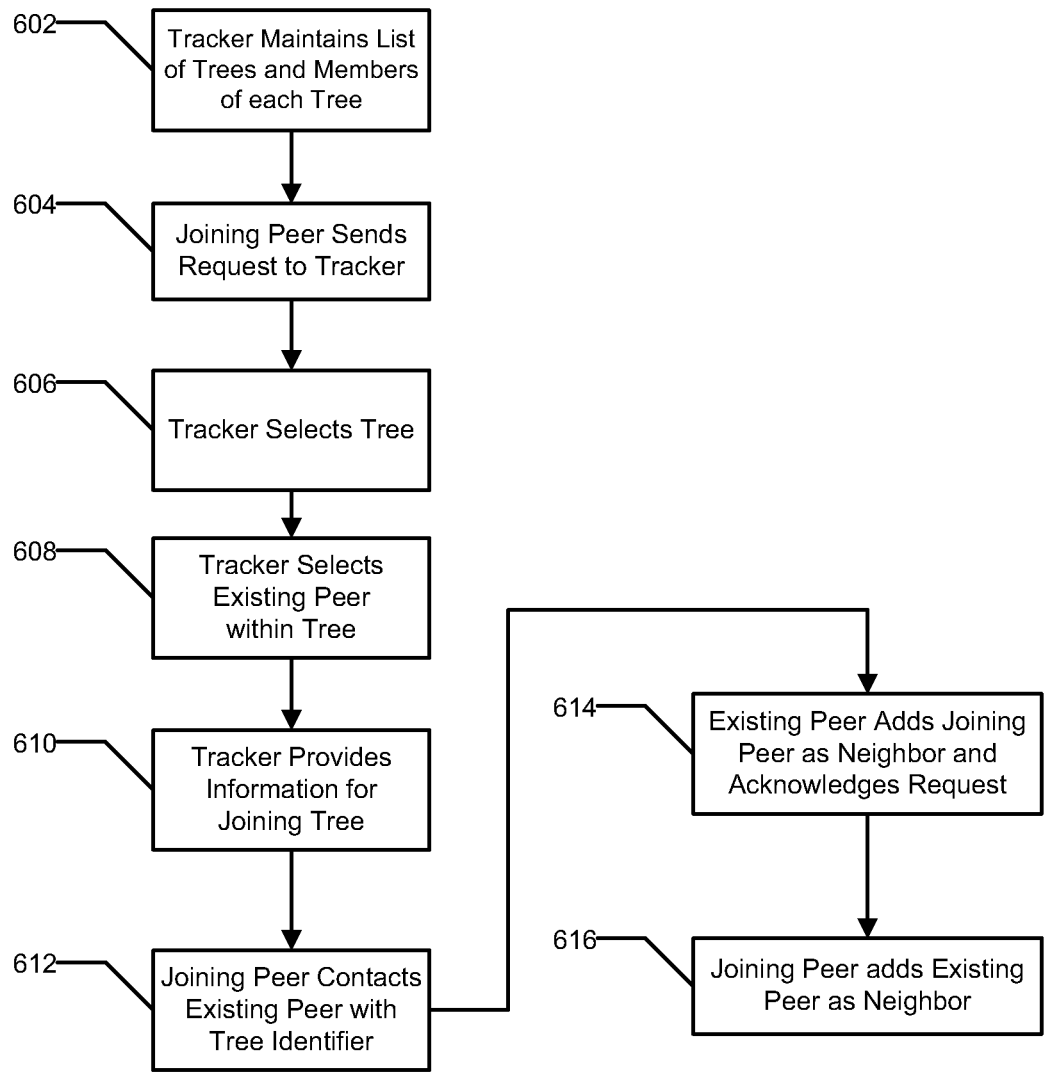
FIG. 6 is a flow diagram illustrating an exemplary method of a peer joining a P2P network in accordance with one embodiment of the present disclosure.

FIG. 6 shows a flow diagram illustrating a method of constructing a P2P network, such as P2P network 500. At 602, a tracker such as tracker 502 can maintain a list of trees, including the members of each tree. In an embodiment, the tracker may not store the topology of any of the trees. However, each peer can maintain a list of trees to which it belongs and its neighbors within each of these trees. At 604, a joining peer can send a request to the tracker to join the P2P network. At 606, the tracker can select a tree to which the joining peer can connect. In an embodiment, the tracker can select the smallest tree, or multiple small trees, for the joining peer to join. By selecting the tree with the smallest number of members, the tracker can ensure that the size of the trees remains relatively balanced. Additionally, the tracker can limit the size of the trees. However, the limit may not be a strict maximum number of peers within the tree and the maximum size for a tree can be within a range of maximum sizes. Having a soft limit can limit an observer, or even a participating peer, from placing a bound on the number of peers within the tree. Therefore, the observer will have a more difficult time in determining a requesting peer's or serving peer's identity. When the tracker does not have a tree available for the joining peer to join, such as when all the trees have reached the current soft limit, the tracker can create a new tree with the joining peer as the first member.

At 608, the tracker can select an existing peer within the tree. The existing peer within the tree can be randomly chosen from the plurality of peers within the tree. At 610, the tracker can provide information about joining the tree to the joining peer. The information can include a tree identifier, an existing peer identifier, and a joining certificate. At 612, the joining peer can send a request to the existing peer including the tree identifier and the joining certificate. At 614, the existing peer can add the joining peer as a neighbor and acknowledge the request. The existing peer can check the tree identifier and joining certificate to ensure that the existing peer belongs in the tree. Verifying the tree identifier and joining certificate can substantially prevent peers from joining trees without permission from the tracker. Alternatively, the existing peer can contact the tracker to verify the joining peer belongs in the tree. At 616, the joining peer can add the existing peer as a neighbor in the tree.

In an embodiment, each peer can join more than one tree. Joining multiple trees can increase the number of paths for the peer to obtain content. Multiple paths may be necessary for parallel content transfer. Further, by using multiple paths to transfer different parts of the same content, the likelihood of an attacker identifying the content can be decreased.

Figure 7:
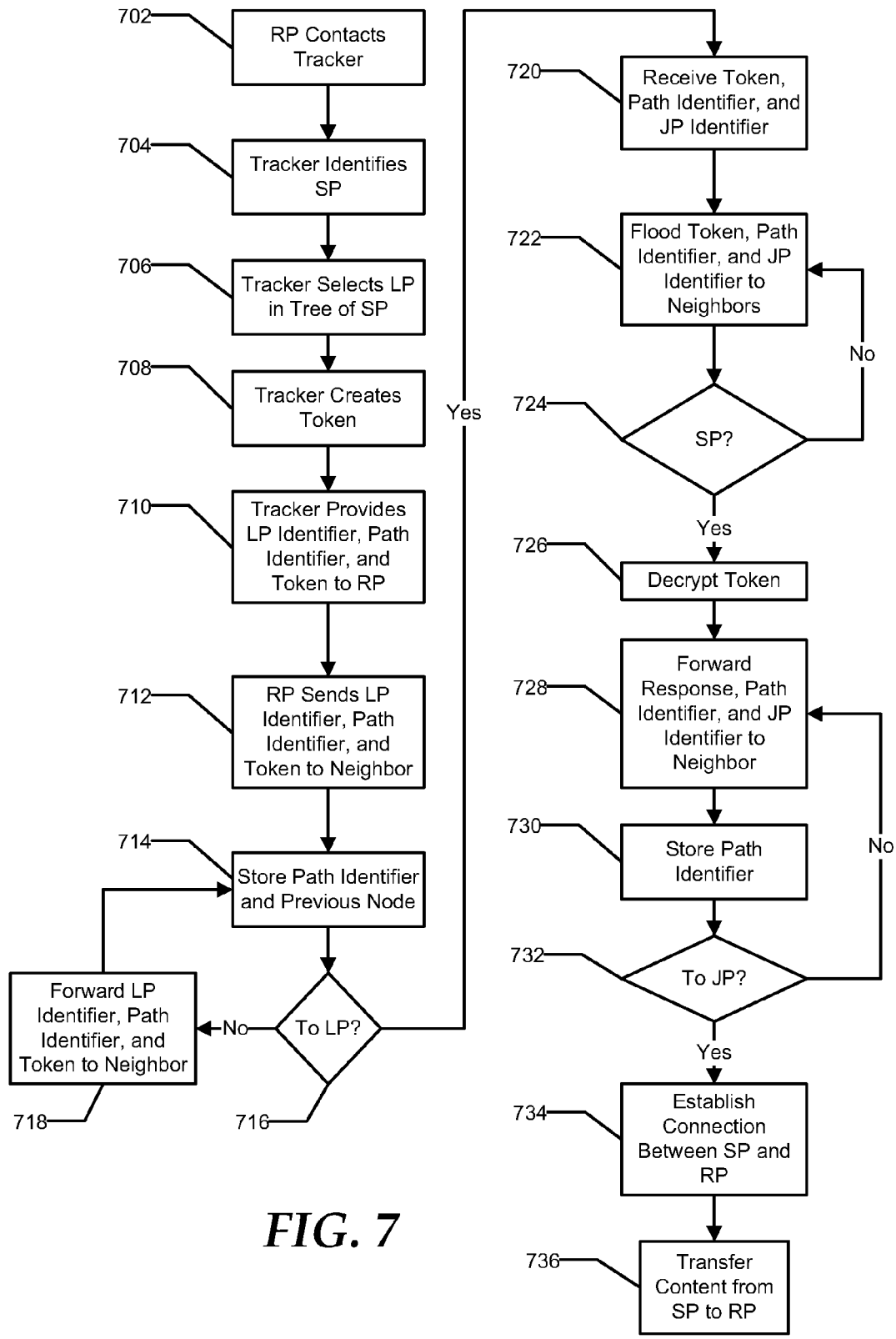
FIG. 7 is a flow diagram illustrating an exemplary method of transferring content through a P2P network in accordance with one embodiment of the present disclosure.

FIG. 7 shows a flow diagram illustrating a method of anonymously transferring content between a serving peer and a requesting peer through a P2P network, such as P2P network 500. At 702, a requesting peer can send a request to a tracker in order to obtain content. At 704, the tracker can identify a serving peer for the content. The serving peer can be a peer randomly selected from a set of peers having the content and belonging to a different tree than the requesting peer. At 706, the tracker can select a random peer within the tree of the requesting peer as a landing point. At 708, the tracker can create a request token. The request token can include an identifier for the content. Additionally, the request token can be encrypted using a public key of the serving peer, substantially preventing other peers from reading the request token and learning the nature of the content. At 710, the tracker can provide the request token, a path identifier, and a landing point identifier to the requesting peer.

At 712, the requesting peer can forward the request token, the path identifier, and the landing point identifier to a neighboring peer. The neighboring peer can store the path identifier, as illustrated at 714. Additionally, the neighboring peer can determine if it will forward the request to the landing point, as illustrated at 716. In an embodiment, the neighboring peer can randomly determine to forward the request to the landing point. Alternatively, when no additional peers are available for forwarding the request, the neighboring peer can forward the request to the landing point. For example, the peer may be a leaf node with no additional peers, or the additional peers may refuse to transfer the content, such as when they have insufficient bandwidth for transferring the content. At 718, when the neighboring peer is not going to forward the request to the landing point, the neighboring peer can forward the landing point identifier, the path identifier, and the request token to another peer.

Alternatively, at 720, when the neighboring peer is going to forward the request to the landing point, the neighboring peer, acting as the jumping point, can forward the path identifier and the request token to the landing point. Additionally, the neighboring peer can attach its own identifier as the jumping point (JP) identifier. The landing point can receive the request token, the path identifier, and JP identifier. At 722, the request token, the path identifier, and a jumping point identifier can be flooded to all neighboring peers of the landing point within the tree including the serving peer. The jumping point identifier is the identity of the peer forwarding the request token to the landing point. Specifically, the landing point can forward the request to each neighboring peer within the tree. Each neighboring peer can forward the request to all their neighboring peers except the peer from which they received the request. This process can continue until each peer within the tree has received the request. In an embodiment, peers within the serving peer tree may not store the path identifier received during flooding, unlike forwarding peers in the requesting peer's tree.

At 724, the peer can determine if it is the serving peer. For example, the peer can attempt to decrypt the request token. If the peer is successful at decrypting the request token, the peer is the serving peer. When the peer is not the serving peer, the peer can forward the request token, the jumping point identifier, and the path identifier to all its neighbors within the tree, as illustrated at 722.

Alternatively, when the peer is the serving peer, the serving peer can identify the requested content based on the request token, as illustrated at 726. Additionally, the serving peer can forward the request to its neighboring peers. Continuing to forward the request throughout the rest of the tree can substantially reduce the likelihood of identifying the serving peer.

At 728, the serving peer can forward a response to a neighboring peer. The neighboring peer can be a downstream peer or an upstream peer. A downstream peer can be a peer to whom the flooded request is forwarded, and an upstream peer can be a peer from which the flooded request is received. At 730, the neighboring peer can store the path identifier, and at 732, the neighboring peer can determine if it will forward the response to the jumping point. This can be similar to determining if a neighbor peer will forward the request to the landing point at 716. For example, the peer can forward the response to the jumping point when the peer randomly decides to forward the response to the jumping point, or when no neighboring peers are available for forwarding the response. For example, no neighboring peers may be available when the peer is a leaf node, or when its neighboring peers refuse to participate in the connection, such as when they have insufficient bandwidth. When the peer is not going to forward the response to the jumping point, the peer can forward the response to a neighboring peer as illustrated at 728.

Alternatively, when the peer is going to forward the response to the jumping point, a connection between the serving peer and the requesting peer can be established, as illustrated at 734. At 736, the serving peer can transfer the content to the requesting peer through the connection including neighboring peers in the serving peer tree, the jumping point and neighboring peers in the requesting peer tree. In an embodiment, communication between the serving peer and the requesting peer can be encrypted to prevent an attacker from identifying the content being transferred. Once the connection between the serving peer and the requesting peer has been established without the serving peer and requesting peer knowing the identity of the other, the serving peer and requesting peer can exchange a session key and other information. The session key may be based on a symmetric key pair, so that is it more efficient to encrypt and decrypt the content.

Figure 8:
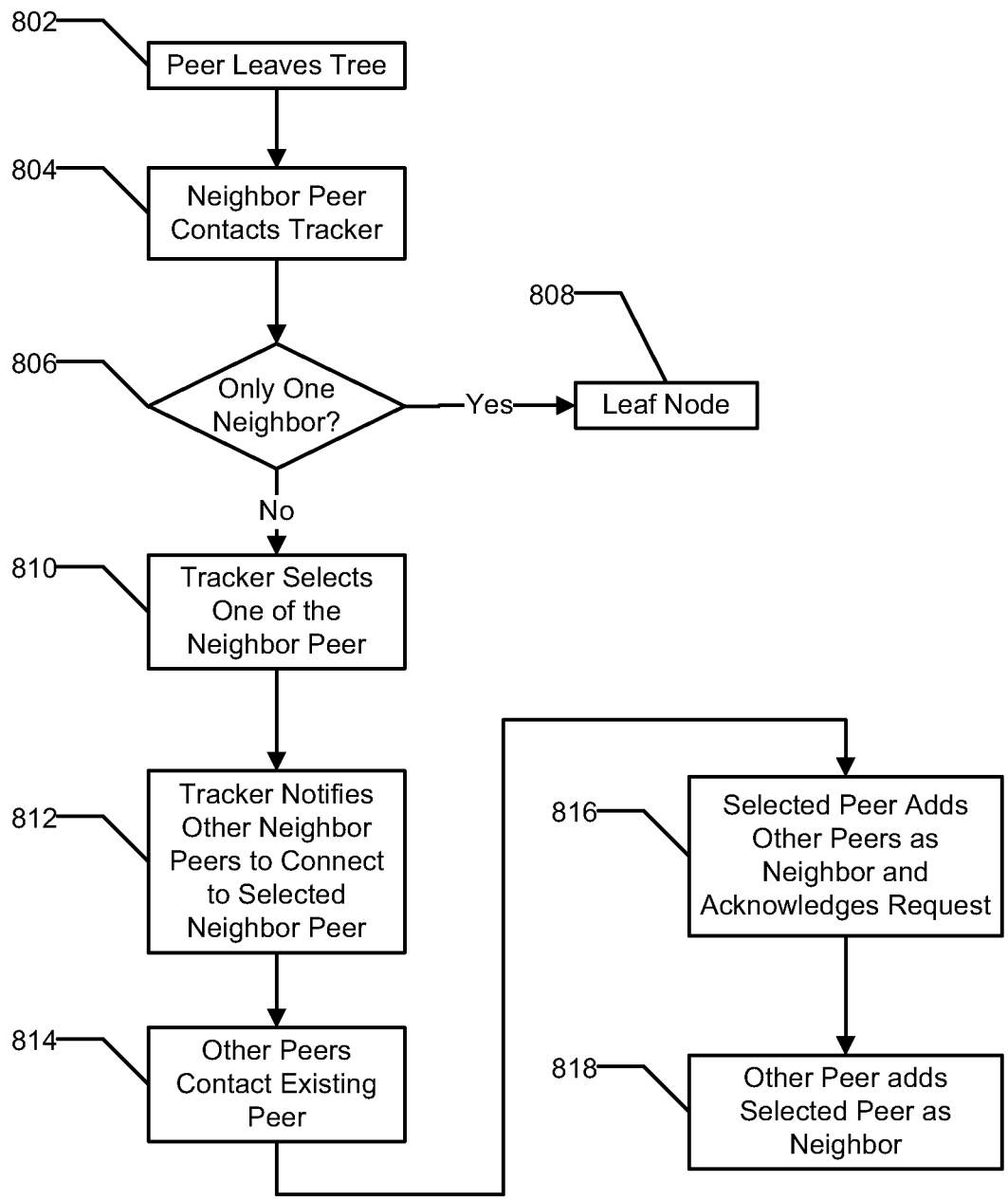
FIG. 8 is a flow diagram illustrating an exemplary method of recovering from the exit of a peer.

FIG. 8 shows a flow diagram illustrating a method of repairing a tree after a peer fails or otherwise leaves the P2P network. At 802, an exiting peer can leave the network. The exiting peer can gracefully exit the network by notifying each of its neighbors that it is leaving. Alternatively, the exiting peer can abruptly exit the network, such as due to a failure. At 804, the neighboring peers of the exiting peer can contact the tracker. The neighboring peers can recognize the loss of the exiting peer either by receiving the notification from the exiting peer or by detecting the loss of a connection to the exiting peer. For example, the neighboring peers may determine a heartbeat communication was not received as expected or detect the TCP connection was lost. In an embodiment, the neighboring peer can attempt to restore the TCP connection prior to contacting the tracker.

At 806, the tracker can determine if more than one neighbor peer has contacted the tracker regarding the loss of the exiting peer. If only one neighbor peer contacts the tracker, then the exiting peer can be a leaf peer, as illustrated at 808, and the loss can be safely ignored. Alternatively, if more than one neighboring peer contacts the tracker, then the tree may have been divided into multiple subtrees and the multiple subtrees may have to be reconnected. At 810, the tracker selects one of the neighboring peers as the new connection point. The connection point can be selected at random from the neighbor peers contacting the tracker regarding the loss of the exiting peer. At 812, the tracker notifies each of the remaining neighbor peers of the new connection point. The remaining neighbor peers contact the connection point, as illustrated at 814. For example, the neighboring peers can send a request to the connection point to establish a connection. The request can be similar to the request sent when a peer joins the P2P network. At 816, the connection point can add the peers as neighbors and acknowledge the request, and at 818, the neighbor peers can add the connection point as a neighbor.

Figure 9:
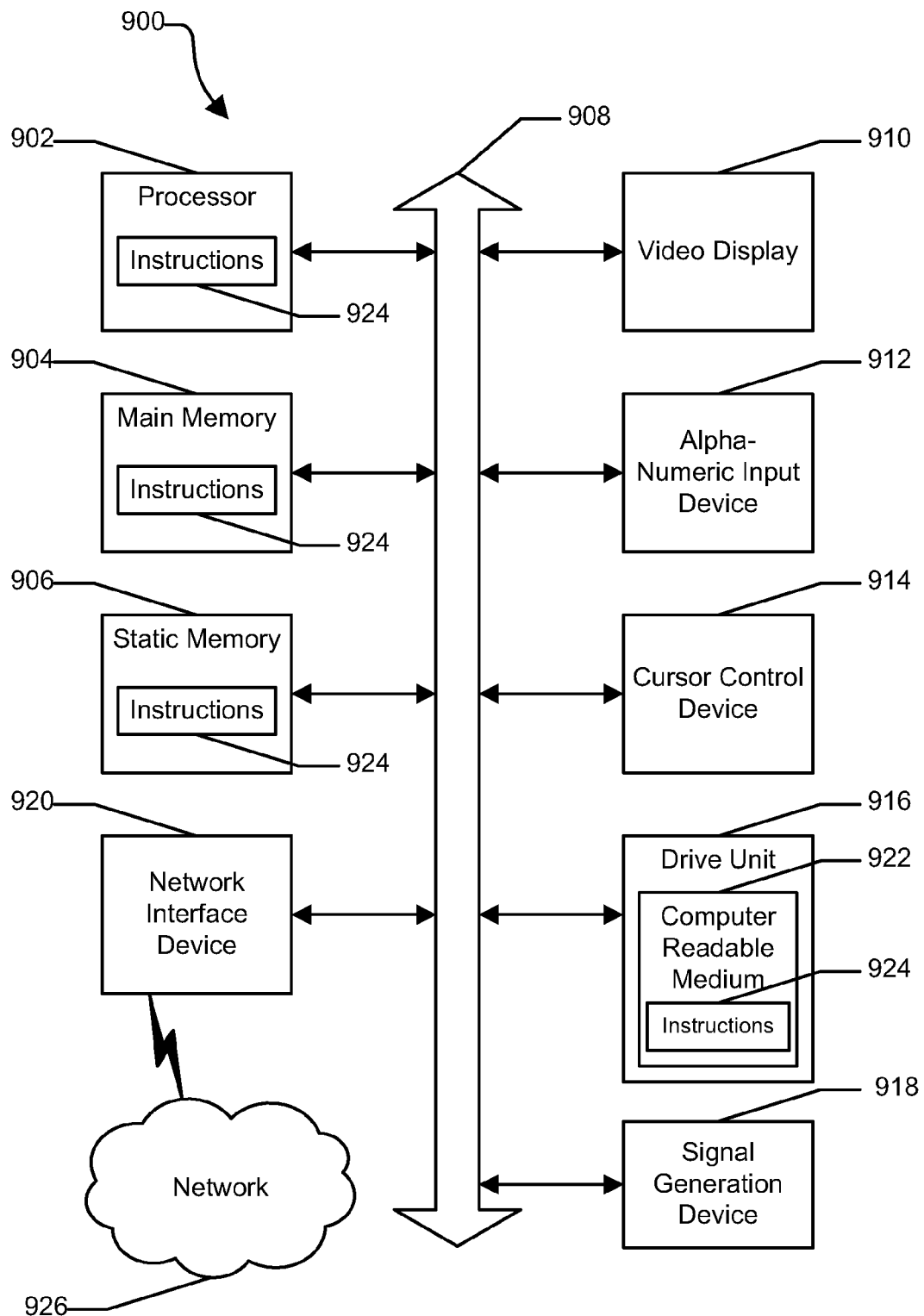
FIG. 9 is an illustrative embodiment of a general computer system.

FIG. 9 shows an illustrative embodiment of a general computer system 900. The computer system 900 can include a set of instructions that can be executed to cause the computer system to perform any one or more of the methods or computer based functions disclosed herein. The computer system 900 may operate as a standalone device or may be connected, such as by using a network, to other computer systems or peripheral devices.

In a networked deployment, the computer system may operate in the capacity of a server or as a client user computer in a server-client user network environment, or as a peer computer system in a P2P (or distributed) network environment. The computer system 900 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

The computer system 900 may include a processor 902, such as a central processing unit (CPU), a graphics processing unit (GPU), or both. Moreover, the computer system 900 can include a main memory 904 and a static memory 906 that can communicate with each other via a bus 908. As shown, the computer system 900 may further include a video display unit 910 such as a liquid crystal display (LCD), an organic light emitting diode (OLED), a flat panel display, a solid-state display, or a cathode ray tube (CRT). Additionally, the computer system 900 may include an input device 912 such as a keyboard, and a cursor control device 914 such as a mouse. Alternatively, input device 912 and cursor control device 914 can be combined in a touchpad or touch sensitive screen. The computer system 900 can also include a disk drive unit 916, a signal generation device 918 such as a speaker or remote control, and a network interface device 920 to communicate with a network 926. In a particular embodiment, the disk drive unit 916 may include a computer-readable medium 922 in which one or more sets of instructions 924, such as software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method for transferring content with a peer to peer network, comprising:
    sending, utilizing instructions stored in memory and executed by a processor, a request from a requesting peer in a first tree of the peer to peer network to a tracker for contacting a serving peer in a second tree of the peer to peer network;
    receiving a request token, a path identifier, and a landing peer identifier, the landing peer identifier including an identity of a landing peer within the second tree other than the serving peer;
    sending a request message to a first peer in the first tree, the request message including the request token, the path identifier, and the landing peer identifier; and
    receiving the content from the serving peer through a transfer path;
    wherein the request token and the path identifier are received from a second peer in the second tree;
    wherein a return message is sent to a third peer in the second tree, the return message including the path identifier and a jump point identifier, the jump point identifier including an identity of a fourth peer in the first tree other than the requesting peer; and
    wherein the transfer path includes the first peer in the first tree, the third peer in the second tree, and the fourth peer in the first tree.

2. The method of claim 1, wherein transferring the content further includes encrypting the content at the serving peer and decrypting the content at the requesting peer.

3. The method of claim 2, wherein transferring the content further includes exchanging a session key with the serving peer, the session key being used for encrypting the content at the serving peer.

4. The method of claim 2, wherein the content is encrypted with an encryption key provided by the tracker in the request token, and the content is decrypted with a decryption key provided by the tracker to the requesting peer.

5. The method of claim 2, wherein the serving peer does not know the identity of the requesting peer and the requesting peer does not know the identity of the serving peer.

6. A tracker system comprising:
    a memory that stores information about a peer to peer network comprising a plurality of trees, the information including the identities of a plurality of participating peers, membership information indicating to which of the trees each participating peer belongs, and the content available from the participating peers; and
    a processor that executes the instructions from the memory to perform operations, comprising:
        receiving a request from a joining peer to join the peer to peer network;
        providing the joining peer with an identity of an existing peer of a first tree to which the joining peer can connect;

updating the membership information for the first tree to include the joining peer;

receiving a request from a requesting peer in a second tree for a content file;

generating a request token including an identifier for the content file, the request token being encrypted with a public key of a serving peer, the serving peer belonging to a third tree; and providing the requesting peer with the request token and an identity of a landing peer in the third tree other than the serving peer, wherein the requesting peer and the serving peer can communicate through the intermediate peer while maintaining anonymity of the serving peer and the requesting peer.

7. The tracker system of claim 6, wherein the operations further comprise:

receiving a notification of an exiting peer leaving the peer to peer network from a neighboring peer of the exiting peer;

determining the number of neighboring peers of the exiting peer sending a notification;

selecting one of the neighboring peers as a connection point when the number of neighboring peers is greater than one; and providing the remaining neighboring peers with the identity of the connection point so that the remaining neighboring peers can connect to the connection point.

8. The tracker system of claim 6, wherein the operations further comprise:

providing an encryption key in the request token; and providing a corresponding decryption key to the requesting peer.

9. A computer-readable device comprising instructions, which, when loaded and executed by a processor, cause the processor to perform operations comprising:

joining a peer to peer network including a plurality of trees;

sending a request to a tracker to join the peer to peer network;

receiving an identity of an existing peer from the tracker;

connecting to the existing peer to join a first tree of the plurality of trees within the peer to peer network;

requesting content from a serving peer;

sending a request for contacting the serving peer to the tracker;

receiving a request token, a path identifier, and a landing point identifier from the tracker, the landing point identifier including an identity of a first peer other than the serving peer within a serving peer tree, the serving peer tree including the serving peer, the first peer, a second peer, and a third peer;

sending a request message to a fourth peer within a requesting peer tree, the requesting peer tree including the requesting peer, the fourth peer, and a fifth peer, the request message including the request token, the path identifier, and the landing point identifier, the serving peer being different from the requesting peer tree;

sending the content to a requesting peer;

receiving the request token, the path identifier, and a jumping point identifier from the second peer, the jumping point identifier identifying the fifth peer;

sending a return message to the third peer, the return message including the path identifier and the jumping point identifier; and transferring the content to the requesting peer through a transfer path including the third peer, the fourth peer, and the fifth peer.

10. The computer-readable device of claim 9, wherein the operations further comprise:

acting as an intermediate node within the requesting peer tree, including:

receiving the request token, the landing point identifier, and the path identifier from a peer;

storing the path identifier;

determining not to forward the request token and the path identifier to the first peer;

forwarding the request token, the path identifier, and the landing point identifier to the fifth peer;

acting as jumping point from the requesting peer tree, including:

receiving the request token, the landing point identifier, and the path identifier from a peer;

storing the path identifier;

determining to forward the request token and the path identifier to the first peer; and forwarding the request token and path identifier to the first peer.

11. The computer-readable device of claim 9, wherein the operations further comprise:

acting as a landing point within the serving peer tree, including:

receiving the request token and the path identifier from a peer;

determining the jumping point identifier; and flooding the request token, the path identifier, and the jumping point identifier to the serving peer tree; and acting as a return node within the serving peer tree, including:

receiving the return message from a peer;

determining to forward the return message to the fifth peer; and forwarding the return message to the fifth peer.

12. The computer-readable device of claim 9, wherein joining a peer to peer network further includes receiving a joining certificate from the tracker, and providing the joining certificate to the existing peer.

13. The computer-readable device of claim 10, wherein the operations further comprise:

avoiding congestion, including:

determining an availability of a resource for participating in a content transfer; and sending a negative acknowledgement to a peer when the resource is not available.

14. The computer-readable device of claim 9, wherein the fourth and fifth peers are different.

* * * * *